E. DE N. SANDS.
STEERING MECHANISM FOR AERIAL TRUCKS.
APPLICATION FILED MAY 12, 1909.
969,301.
Patented Sept. 6, 1910.
6 SHEETS—SHEET 4.
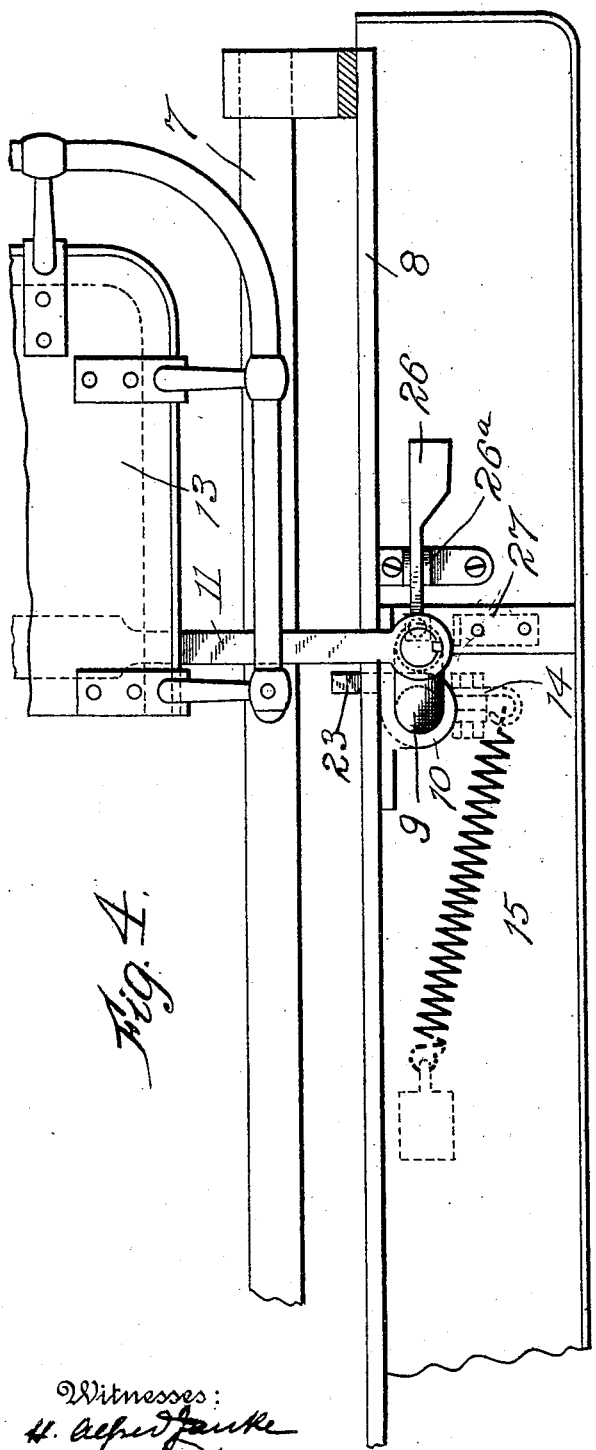
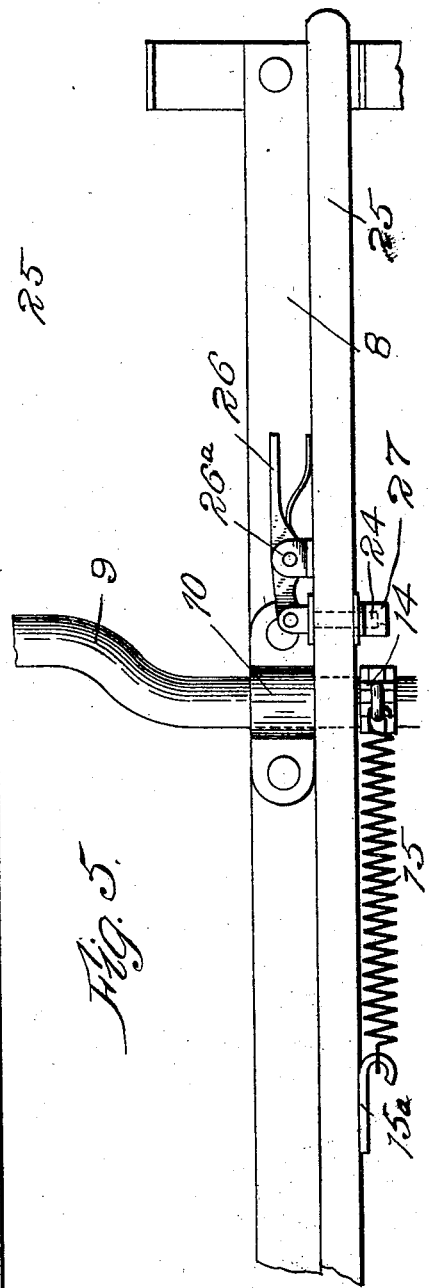
Fig. 4.
Fig. 5.
Witnesses:
Inventor

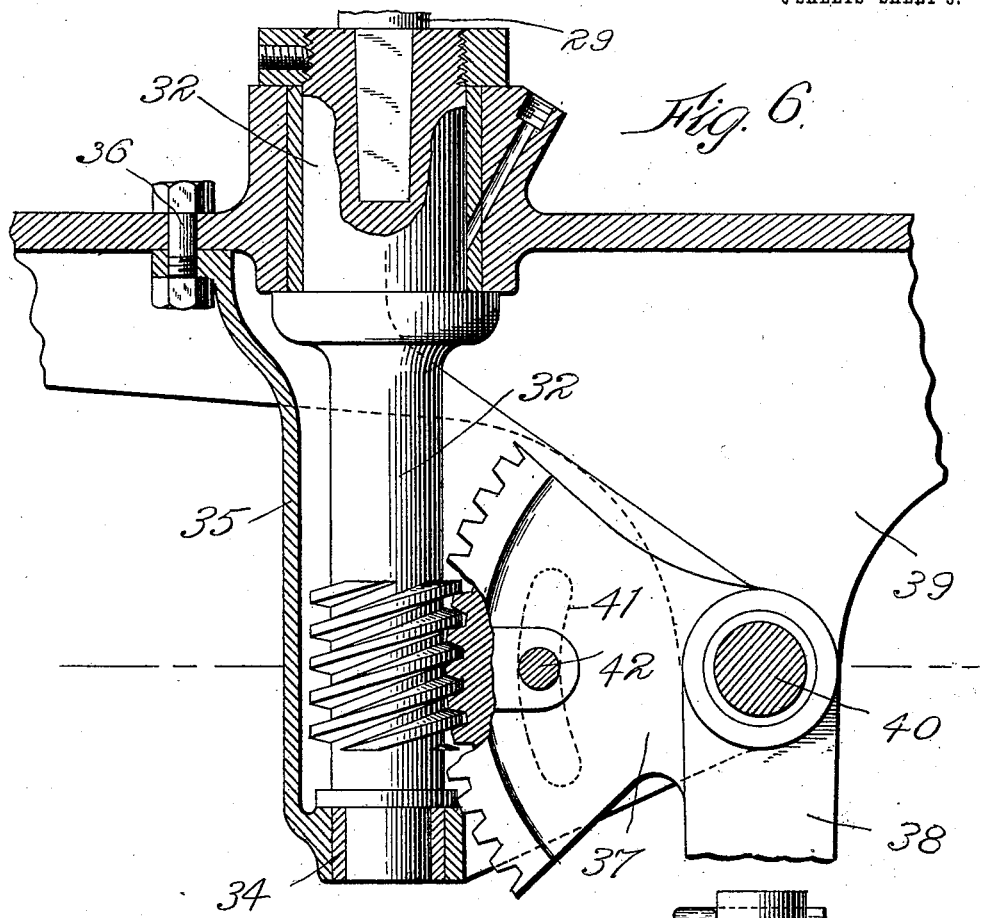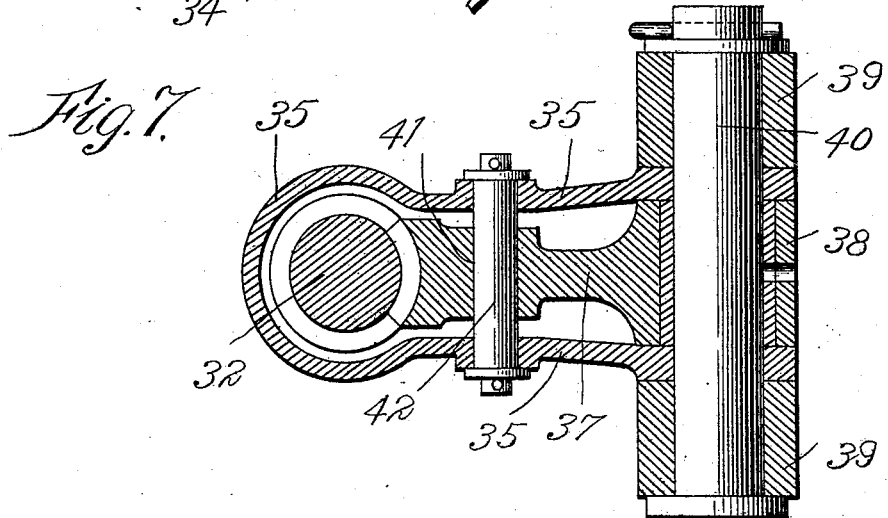

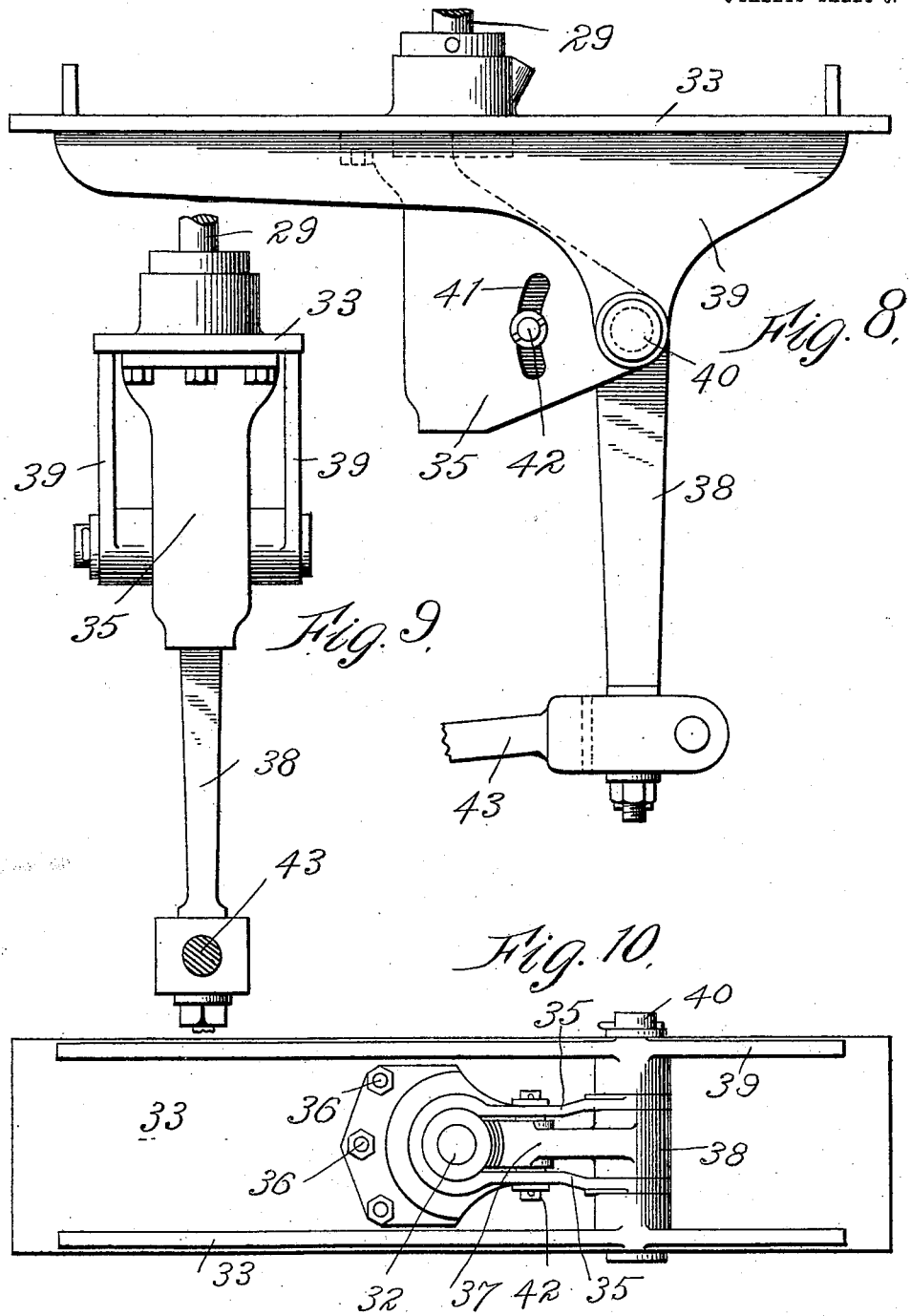

UNITED STATES PATENT OFFICE.

EDWYN DE N. SANDS, OF ELMIRA, NEW YORK.

STEERING MECHANISM FOR AERIAL TRUCKS.

969,301.  Specification of Letters Patent.  Patented Sept. 6, 1910.

Application filed May 12, 1909. Serial No. 495,408.

*To all whom it may concern:*

Be it known that I, EDWYN DE N. SANDS, a citizen of the United States, residing at Elmira, in the county of Chemung and State of New York, have invented certain new and useful Improvements in Steering Mechanism for Aerial Trucks, of which the following is a specification.

My invention relates in general to a steering device with removable tiller which may be used for steering a pair of wheels of trucks of considerable length, such as are used, for instance, in aerial apparatus intended for fighting fire.

The particular and novel features of the apparatus hereinafter described are the compact and non-reversible arrangement of the steering gear and the arrangement of the tillerman's seat so that it can be quickly removed automatically when the aerial structure is to be raised.

I have illustrated my improvements in the accompanying drawings, in which—

Figure 1:
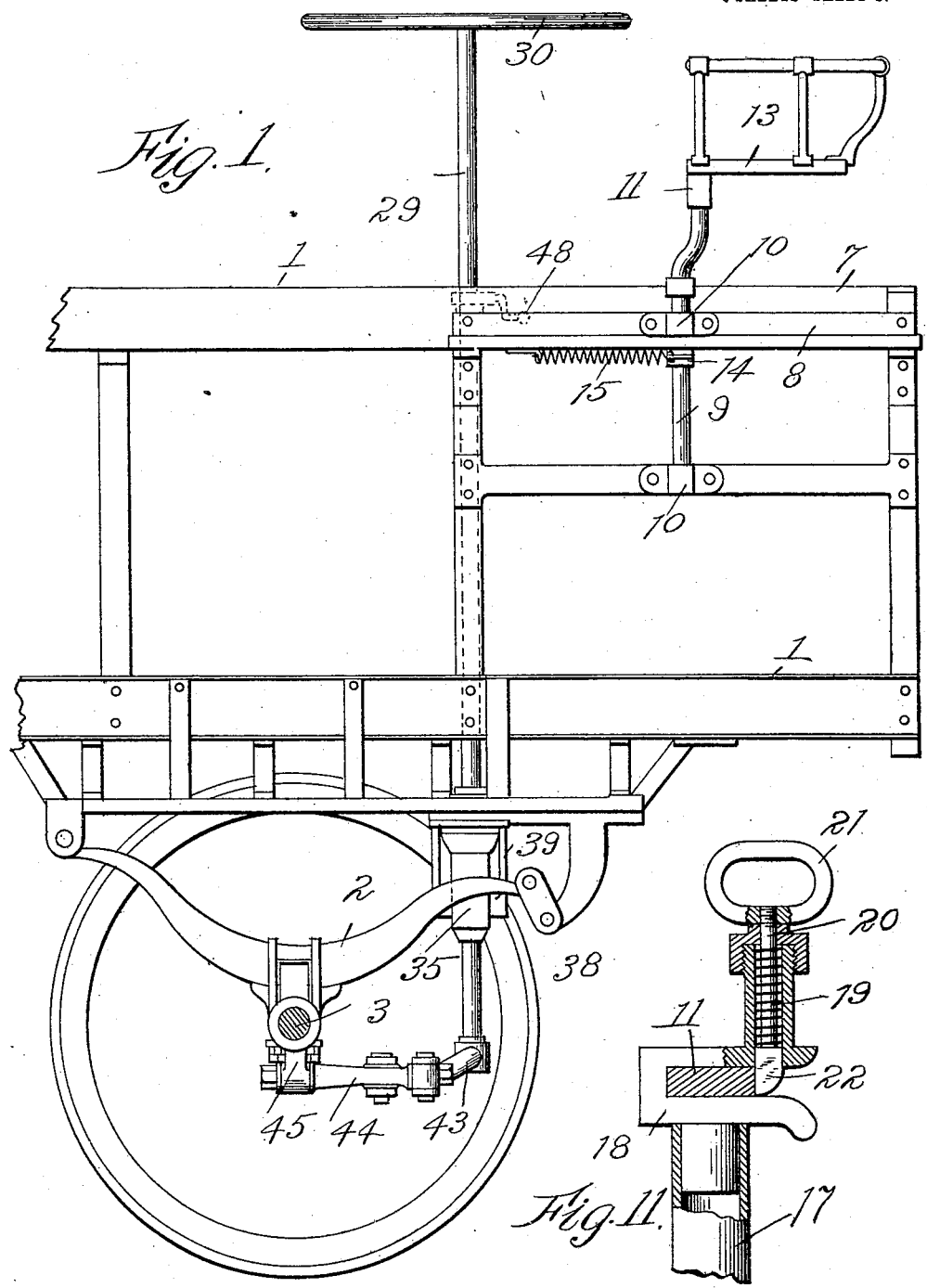
Figure 2:
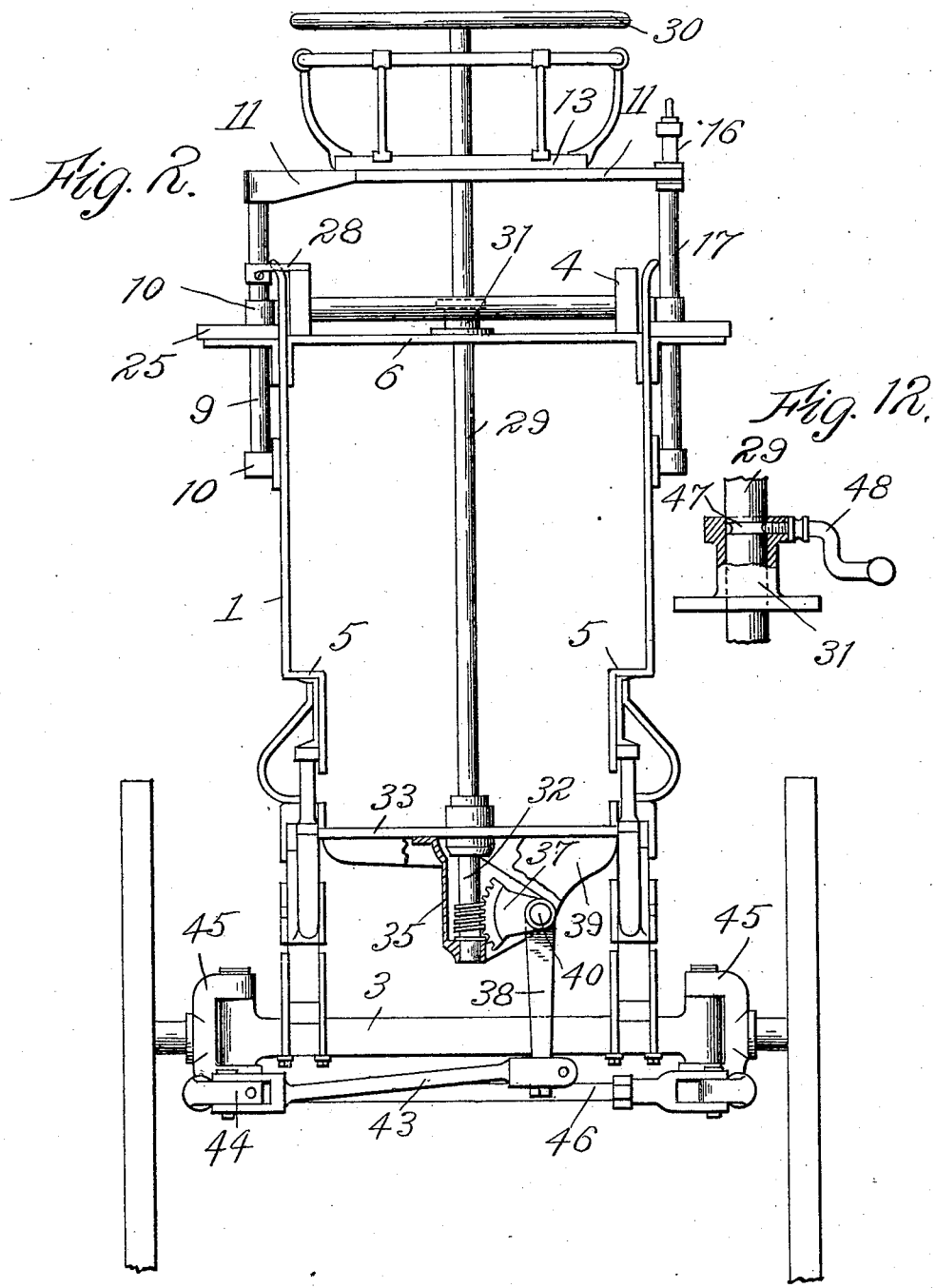
Figure 3:
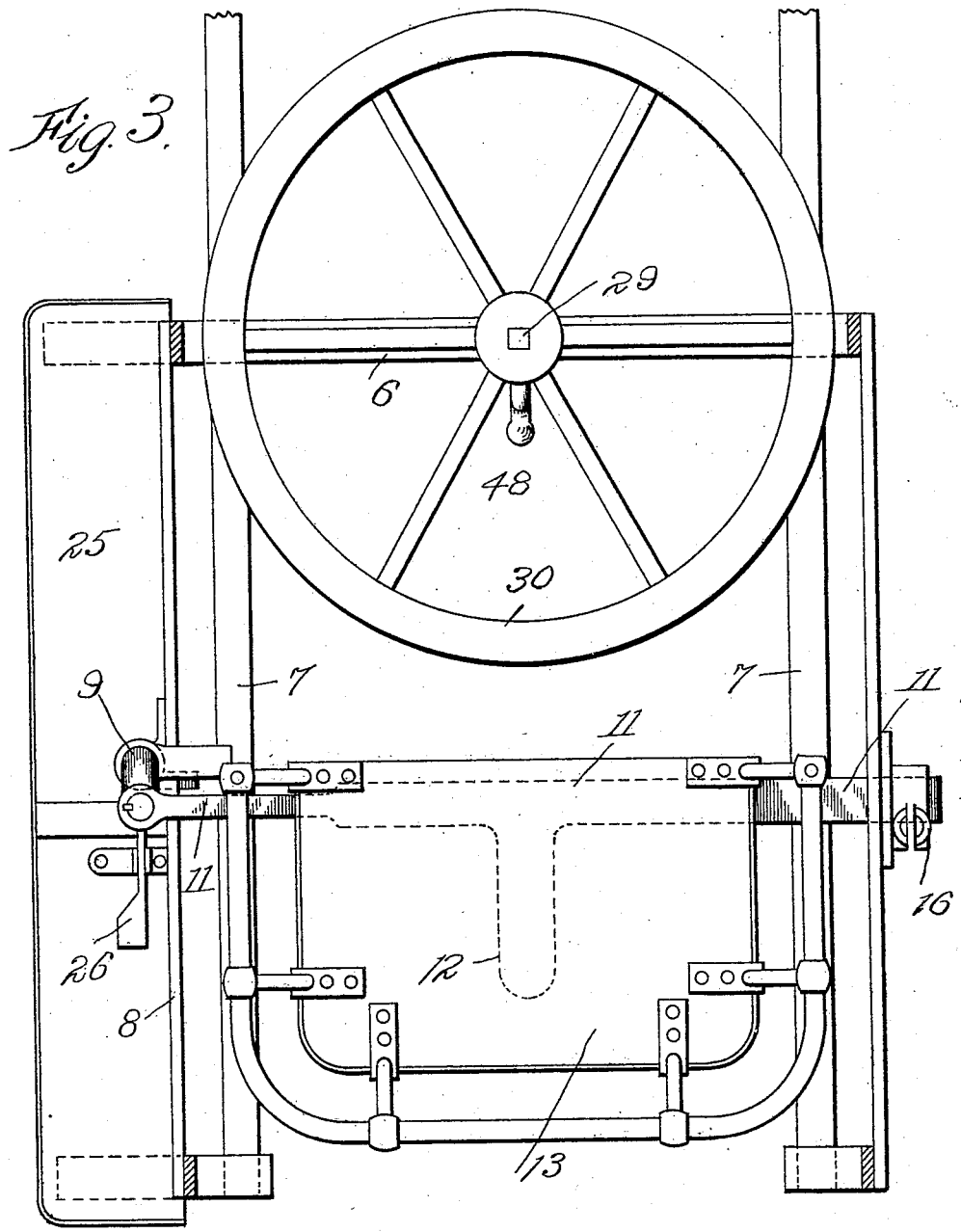

Figure 1 is a side elevation of the rear end of the truck. Fig. 2 is a rear elevation of the truck. Fig. 3 is a top view of the rear end of the truck. Fig. 4 is a plan detail view of the tillerman's seat and its pivot. Fig. 5 is a side view of a part thereof. Fig. 6 is a detail side view of the steering worm gear, partially in section. Fig. 7 is a plan view thereof. Fig. 8 is a full side view of the steering worm casing. Fig. 9 is a left hand end view, and Fig. 10 is a bottom view thereof. Fig. 11 is a detail view of the latch for locking the tillerman's seat. Fig. 12 is a detail illustration of the upper guide bearing of the tiller shaft.

In Fig. 1, 1 is the frame of the truck, partly broken away, which is suitably supported by longitudinal springs 2 connected to the rear axle 3 in the usual manner. As may be seen from Fig. 2, shoulders 5 are provided on the uprights of frame 1 which serve as a support for the ladders (not shown). Furthermore, the uprights of frame 1 are connected near their upper ends by cross bar 6, which serves as a support for a part of the aerial ladder structure, as shown at 4. Frame 1 carries on its rear end a structure 7 which serves as a support for the tillerman's seat, and for the tiller, both of which I will now describe in detail.

As will be seen from Figs. 1 and 2, a vertical shaft 9 is pivotally supported at 10 laterally of the extension 7 by its horizontal bars 8—8. To the upper end of shaft 9, which is rearwardly offset, as shown in Fig. 1, is suitably fastened a cross bar 11, which has a rearwardly extending tongue 12 intermediate its ends (shown in dotted lines in Fig. 3), the bar with its tongue serving as a support for the tillerman's seat 13 proper. Below the upper pivot point 10 is clamped to shaft 9 a shackle 14, which is more clearly illustrated in Figs. 4 and 5 in plan and side elevation. To the hook of the shackle is hooked a spring 15, the other end of which is fastened at 15ª to the upper horizontal bar 8, so that the spring will be under tension when the seat is in its normal position; that is, as shown in Figs. 1 and 2. Thus spring 15 will have the tendency to swing bar 11 of the seat from its transverse position into a position longitudinal of the truck structure, in which latter position the seat clears the path of the aerial structure 4 when it is hoisted up. In order to hold seat 13 in its normal position, as shown in Fig. 2, a latch 16 is provided which engages and locks the free end of bar 11. This latch is mounted on an upright 17, mounted on the correspondingly opposite side of the truck from where shaft 10 is mounted and fastened to horizontal bars corresponding to those shown at 8—8 in Fig. 1. A detail illustration of latch 16 is shown in Fig. 11. As will be seen from this figure, it consists of a U-shaped portion 18 of suitable size to hold the free end of bar 11, and provided with a hollow upright extension 19 in which a spring pressed plunger 20, with a handle 21, is disposed. The lower end of the plunger has a nose 22, the curved portion of which extends outwardly, so that the plunger will yield when bar 11 is thrust into U 18, where it is held locked by the straight portion of nose 22, and from which it can be released only by pulling handle 21. U 18 has flaring ends, so as to facilitate the insertion of bar 11. As will be seen from Fig. 4, shackle 14 has an inward extending lug 23, which, when the seat is thrown out of its transverse position into the longitudinal position will fall behind a foot operated latch pin 24. This pin is mounted on the running board 25, extending longitudinally of the truck frame. The pin is operated by the spring pressed foot pedal 26, also pivotally mounted at 26ª on the running board, by which pedal it is held normally in the position shown in Fig. 5 in dotted lines. A stop 27 is provided against which lug 23 abuts after it has fallen behind pin 24. In order to return seat 13 into its normal transverse position the operator presses foot pedal 26, which withdraws the pin and then returns the seat into its normal position against the tension of spring 15 and thrusts the free end of bar 11 into latch 16, where it is locked as described above. On vertical shaft 9 is fixed a lug 28 in such position that if seat 13 is in its normal transverse position this lug will extend across one side of aerial structure 4, which rests on cross bar 6, as shown in Fig. 2, so that the ladder is prevented from upward movement when the truck is in motion. When seat 13 is removed to clear the path of the ladder lug 28 will swing with the seat and thus release the ladder.

I will now describe the steering device of the truck.

In front of the tillerman's seat is vertically disposed tiller shaft 29, intermediate the two sides of the truck, as shown in Fig. 2. This shaft carries at its upper end tiller wheel 30 and is journaled near its upper end in boss 31, fastened on cross bar 6 of the truck frame. This boss is illustrated in side elevation and in larger scale in Fig. 12. As will be seen from this figure, the tiller shaft 29 is grooved at 47 within boss 31. A hand screw 48 provided on boss 31 can be screwed sufficiently deep into the boss to engage with its inner end groove 47 so as to prevent the shaft from longitudinal movement. The lower end of shaft 29 seats with a square taper in the steering worm shaft 32, as shown in detail in Fig. 6. It will thus be seen that when shaft 29 should be removed in order to clear the ladders stored in the truck frame through which the shaft extends, hand screw 48 is unscrewed and shaft 29 thus released from boss 31 so that it can be pulled upward. The steering worm gear, as illustrated in detail in Fig. 6, comprises the worm shaft 32 journaled at its upper end in cross bar 33 of the truck frame, and with its lower end in a step bearing 34 of casing 35, which surrounds the worm gear and is bolted at 36 to cross bar 33. Cross bar 33 has two flanges 39, one on either side, which extend downward and form a support for the pivot of worm sector 37 and steering arm 38, which are both made integral so as to avoid the necessary bolts and keys which are usually employed in steering gears of that kind for connecting the steering arm with the worm sector. It will be seen from Figs. 6 and 7 that worm sector 37 is in engagement with the worm of worm shaft 32, the pitch of the worm gear being chosen so that it will be self-locking. It will also be seen that the worm sector 37 is disposed between the two flanges 39 and pivotally attached thereto by means of pivot pin 40. Between sector 37 and flanges 39 are also disposed the ends of the two lateral wings of casing 35, which wings are held in place by means of pivot pin 40. Thus it will be seen that the casing which supports the worm gear forms a rigid unit securely attached to the frame work of the truck, which is most essential, owing to the great strain to which steering gears of that kind are subject. The relative location of casing 35 and flanges 39 is clearly shown in side elevation, left hand end view and bottom view in Figs. 8, 9 and 10, respectively. In order to limit the throw of the gear, a circular slot 41 is provided in each lateral wing 35, which two slots serve as a guide for pin 42, extending transversely through sector 37. To the lower end of steering arm 38 is jointed steering rod 43, which is at its other end connected with the steering knuckle 44 of the left hand wheel of the truck. The wheels are pivotally attached to the axle 3 in the well known manner by yokes 45 which are linked together by connecting rod 46.

By the arrangement of the various features as above described it will be seen that the truck can be very quickly operated in a very simple manner, and that at the same time, owing to the self-locking feature of the steering gear, there is no danger that the tiller wheel be thrown out of the tillerman's hands, as has been the case at various times in trucks heretofore used, owing to the tremendous strain to which the wheels are subject when the truck is rushed over obstacles of any kind.

What I claim is:

1. In a truck of the character described, having a suitable frame to receive the load, a non-reversible worm gear for steering one pair of truck wheels, said gear comprising a worm shaft and a steering sector having a steering arm integral therewith, a cross bar on said frame in which one end of said worm shaft is journaled, said cross bar having two downward extending flanges connected by a pivot pin for pivotally holding said sector between them, a gear casing bolted to said cross bar and serving as a bearing for the other end of said worm shaft, said casing having two lateral wings laterally surrounding said worm gear and being held between said flanges by the pivot of said sector with said sector between said two wings.

2. In a truck of the character described, having a suitable frame to receive the load, a non-reversible worm gear for steering one pair of truck wheels, said gear comprising a worm shaft and a steering sector having a steering arm integral therewith, a cross bar on said frame in which one end of said worm shaft is journaled, said cross bar having two downward extending flanges connected by a pivot pin for pivotally holding said sector between them, a gear casing bolted to said cross bar and serving as a bearing for the other end of said worm shaft, said casing having two lateral wings laterally surrounding said worm gear and being held between said flanges by the pivot of said sector with said sector between said two wings, a pin disposed transversely in said sector, and a circular slot in either of said wings to receive the ends of said pin to limit the angular motion of said sector.

3. A truck of the character described, having a suitable frame to receive the load, a non-reversible worm steering gear for one pair of truck wheels, a vertical tiller shaft for operating said gear, a boss near the upper end for guiding said shaft, a cross bar on the truck frame supporting said boss, a groove in the shaft portion located within the boss, and a hand screw on said boss engaging in said groove to prevent the shaft from vertical movement, the lower end of said shaft being square tapered, a correspondingly shaped socket being provided on said worm gear for receiving said square end, said tiller shaft adapted to be moved upwardly when said hand screw is disengaged from said groove.

EDWYN DE N. SANDS.

Witnesses:
HARRY E. KNIGHT,
H. ALFRED JANKE.